United States Patent [19]
Thompson

[11] 3,724,425
[45] Apr. 3, 1973

[54] WATER DISTRIBUTION SYSTEM FOR POULTRY AND SMALL ANIMALS

[76] Inventor: Earl Clayton Thompson, Route 2, P.O. Box 453, Waco, Tex. 76710

[22] Filed: May 20, 1970

[21] Appl. No.: 39,107

[52] U.S. Cl....................................119/72, 119/72.5
[51] Int. Cl..............................................A01k 07/00
[58] Field of Search.......119/72, 74, 81, 72.5, 56, 73, 119/75

[56] References Cited

UNITED STATES PATENTS

| | | | |
|---|---|---|---|
| 3,263,652 | 8/1966 | Nakajima et al. | 119/72.5 |
| 2,879,743 | 3/1959 | Hostetler | 119/81 |
| 3,279,436 | 10/1966 | Haen et al. | 119/56 R |
| 3,330,255 | 7/1967 | Scott et al. | 119/56 R |
| 3,537,430 | 11/1970 | Peppler | 119/72.5 |
| 3,324,834 | 6/1967 | McKinstry | 119/78 |
| 1,903,767 | 4/1933 | Karst | 119/72.5 |
| 3,306,263 | 2/1967 | Johnson | 119/73 |
| 3,126,873 | 3/1964 | Mikaelsen | 119/75 |
| 3,353,518 | 11/1967 | Hart | 119/75 |

Primary Examiner—Aldrich F. Medbery
Attorney—Peter J. Murphy & Cecil L. Wood

[57] ABSTRACT

For providing a supply of drinking water to growing poultry and small animals, a manifold conduit or pipe adjustably supported in spaced relation to the floor of a building, such as a poultry house. The manifold is supported from the roof structure of the building by a cable system including a winch for selectively adjusting the height of the manifold. A stabilizer system to prevent lateral movement of the manifold includes a cable extending in close parallel relation thereto and being coupled thereto at spaced intervals, the cable being anchored to the building structure at the ends of the manifold to move vertically therewith to accommodate height adjustments. The manifold includes spaced nibbler valves which are actuated by the animals seeking water to discharge water from the manifold according to demand. Float valve actuated reservoirs are mounted at predetermined heights relative to the manifold to regulate the water pressure available at the drinking valves. A heating cable extends through the manifold to prevent freezing of the water within the manifold.

2 Claims, 10 Drawing Figures

INVENTOR.
Earl Clayton Thompson

INVENTOR.
Earl Clayton Thompson
BY
ATTORNEY

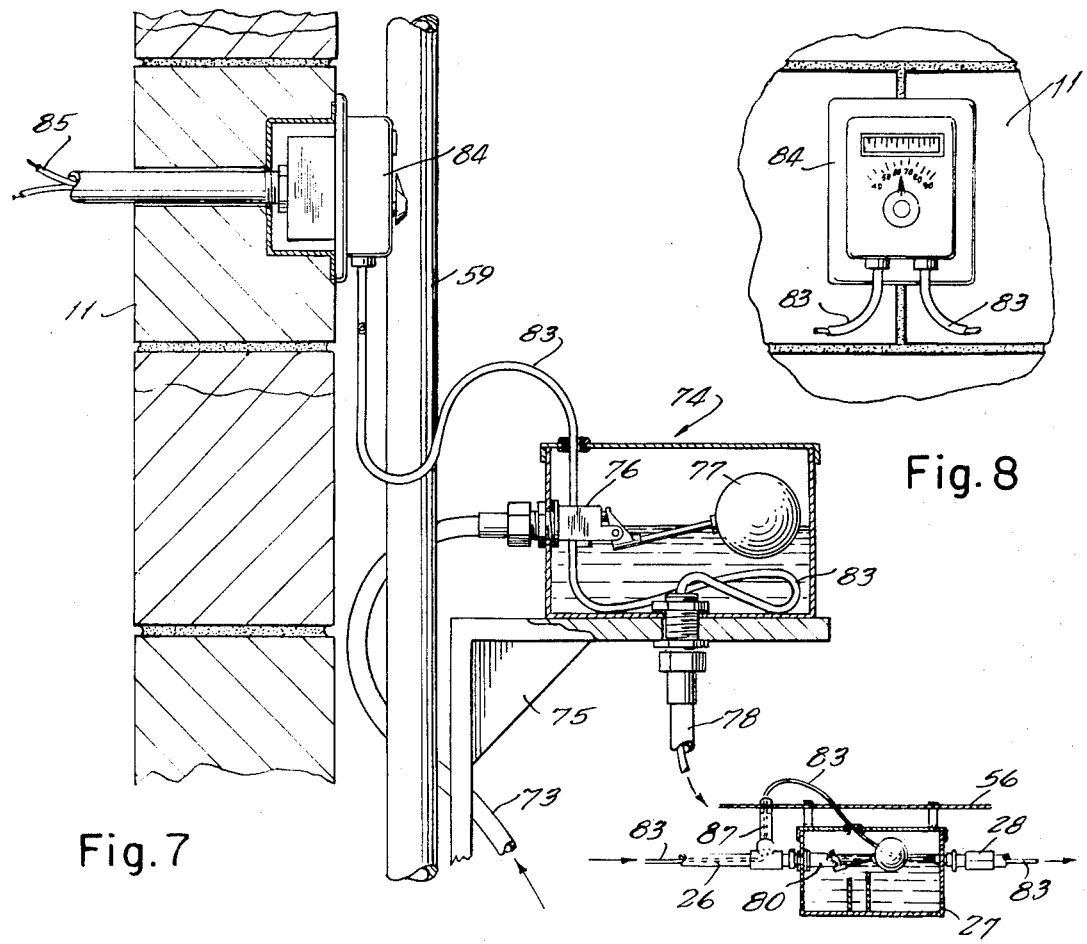
Fig. 7
Fig. 8
Fig. 10
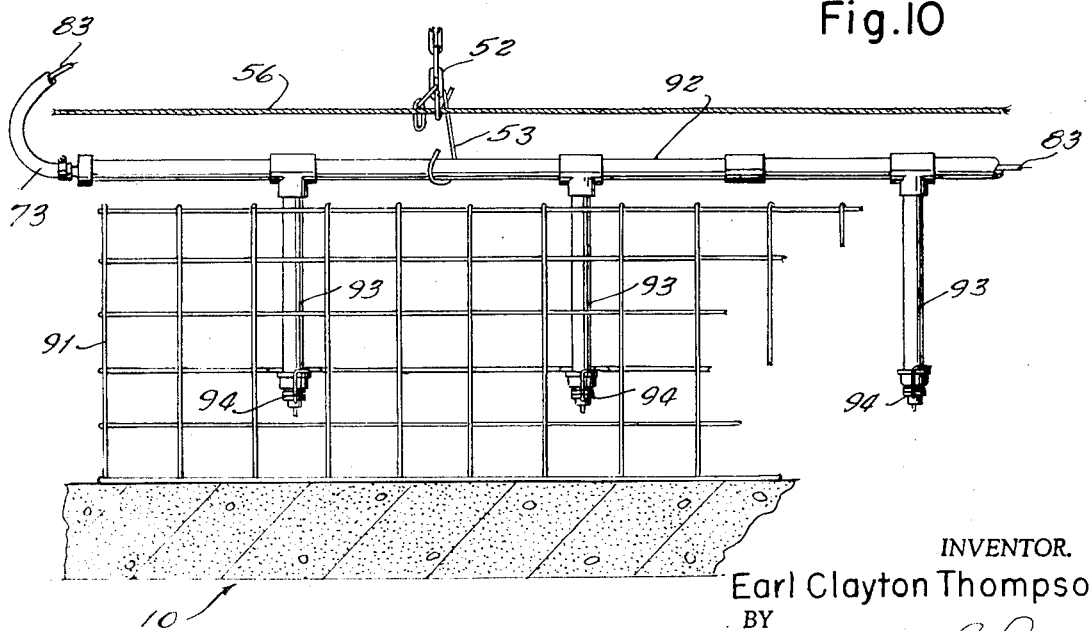
Fig. 9
INVENTOR.
Earl Clayton Thompson
BY
ATTORNEY

WATER DISTRIBUTION SYSTEM FOR POULTRY AND SMALL ANIMALS

BACKGROUND AND SUMMARY OF THE INVENTION

This invention relates to a water distribution system for poultry and small animals, and particularly to a system adapted for use in a building enclosure for the watering of animals during the various stages of growth.

An object of the invention is to provide a water distribution system particularly adapted for use in a poultry house for supplying the water needs of fowl from birth to maturity.

Another object of the invention is to provide such a system wherein the water dispensing units are operable by the individual fowl according to their needs.

A further object of the invention is to provide such a water distribution system wherein the height of the water dispensing units is readily adjustable for accommodating fowl during the various stages of growth.

Still another object of the invention is to provide a water distribution system for animals including means for regulating the pressure of the water available at the water dispensing units.

A still further object of the invention is to provide a water distribution system for animals which includes nibbler-type valves operable by the individual animals according to their needs.

Broadly, a system according to the invention includes a dispensing manifold comprising an elongated conduit extending horizontally in spaced relation to an enclosure floor and which includes spaced dispensing valves operable by the animals for releasing water from the manifold. The manifold is adjustably spaced relative to the enclosure floor by means of a cable suspension means. A stabilizer means anchors the manifold against lateral motion while permitting a wide range of height adjustment to accommodate animals of varying size. More particularly, the system includes means for regulating the pressure and the temperature of the water within the manifold.

FIG. 7 is a fragmentary vertical sectional view of the water inlet for the system illustrating the water pressure and water temperature control systems;

FIG. 8 is a front elevational view of a water temperature control thermostat;

FIG. 9 is a fragmentary view of an alternative form of drinking manifold; and

FIG. 10 is a fragmentary view of a secondary water pressure control valve connected into the manifold, as shown in FIGS. 1 and 2.

Figure 1:
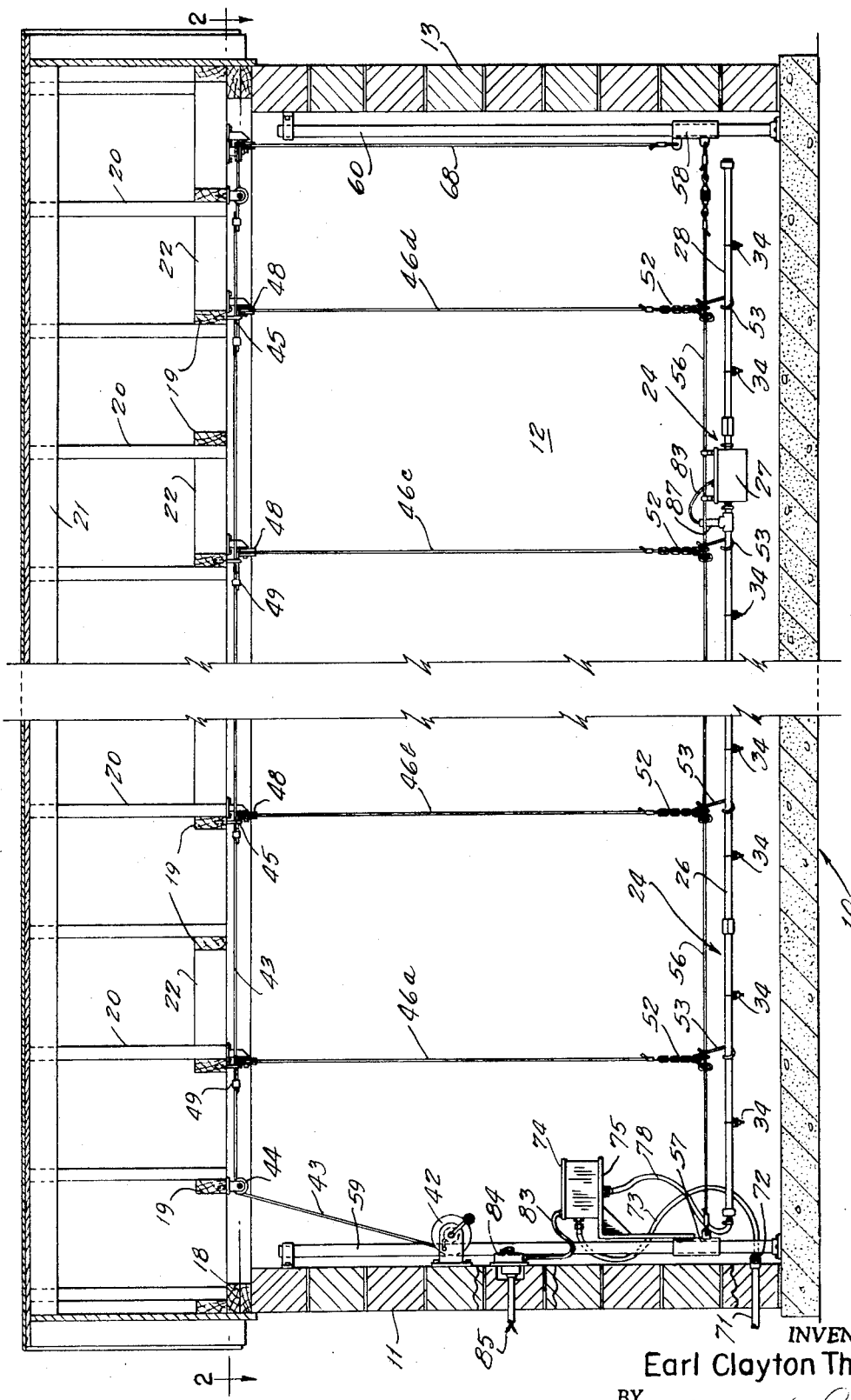
FIG. 1 is a sectional view of a rectangular enclosure taken in a vertical plane along the longitudinal center line thereof, and illustrating a preferred form of watering system according to the invention.
Figure 2:
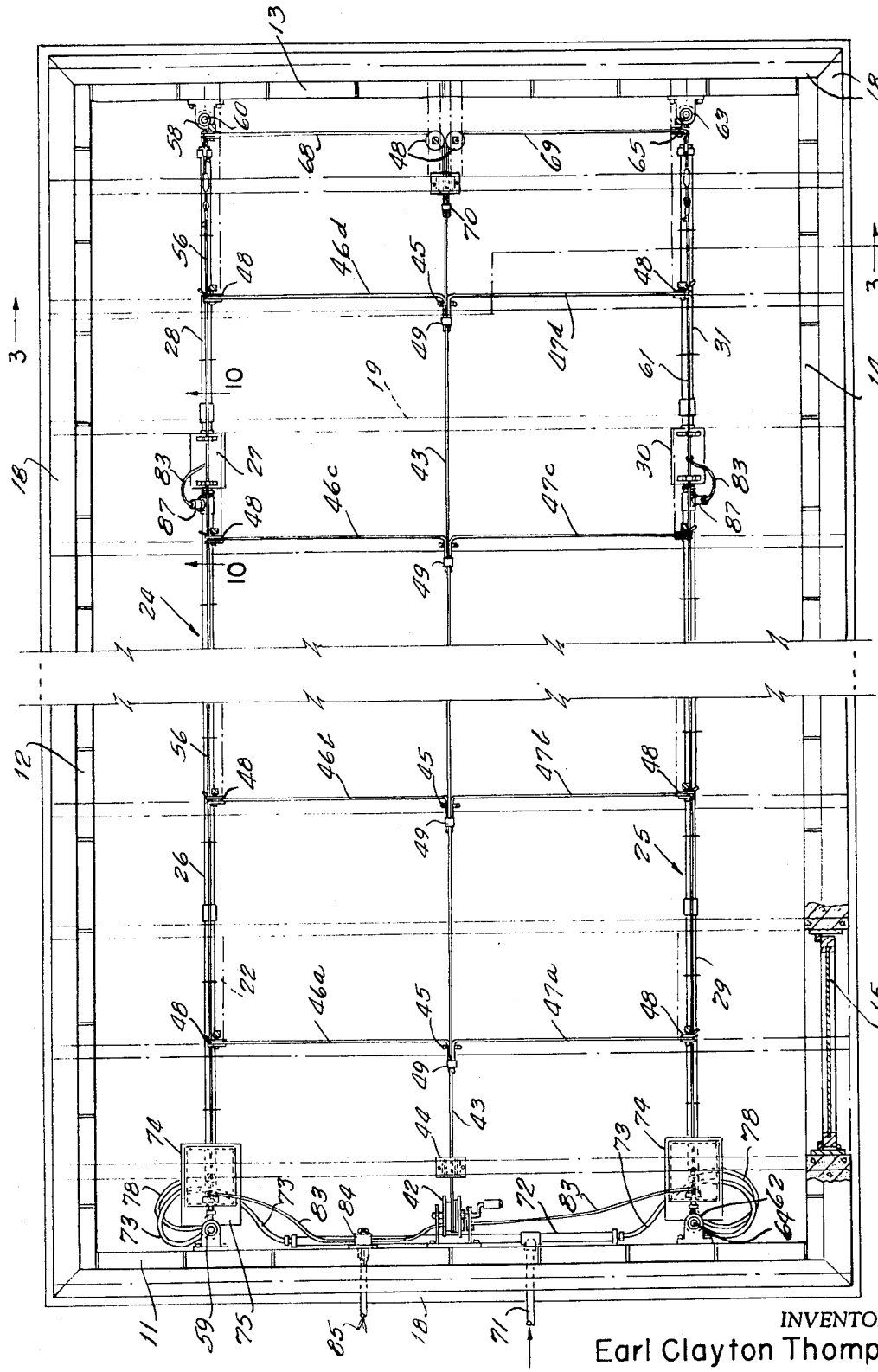
FIG. 2 is a plan view of the enclosure shown in FIG. 1, taken along the line 2—2 thereof on the plane of the roof plates, with the roof structure not shown except for the tie beams which are shown in phantom.
Figure 3:
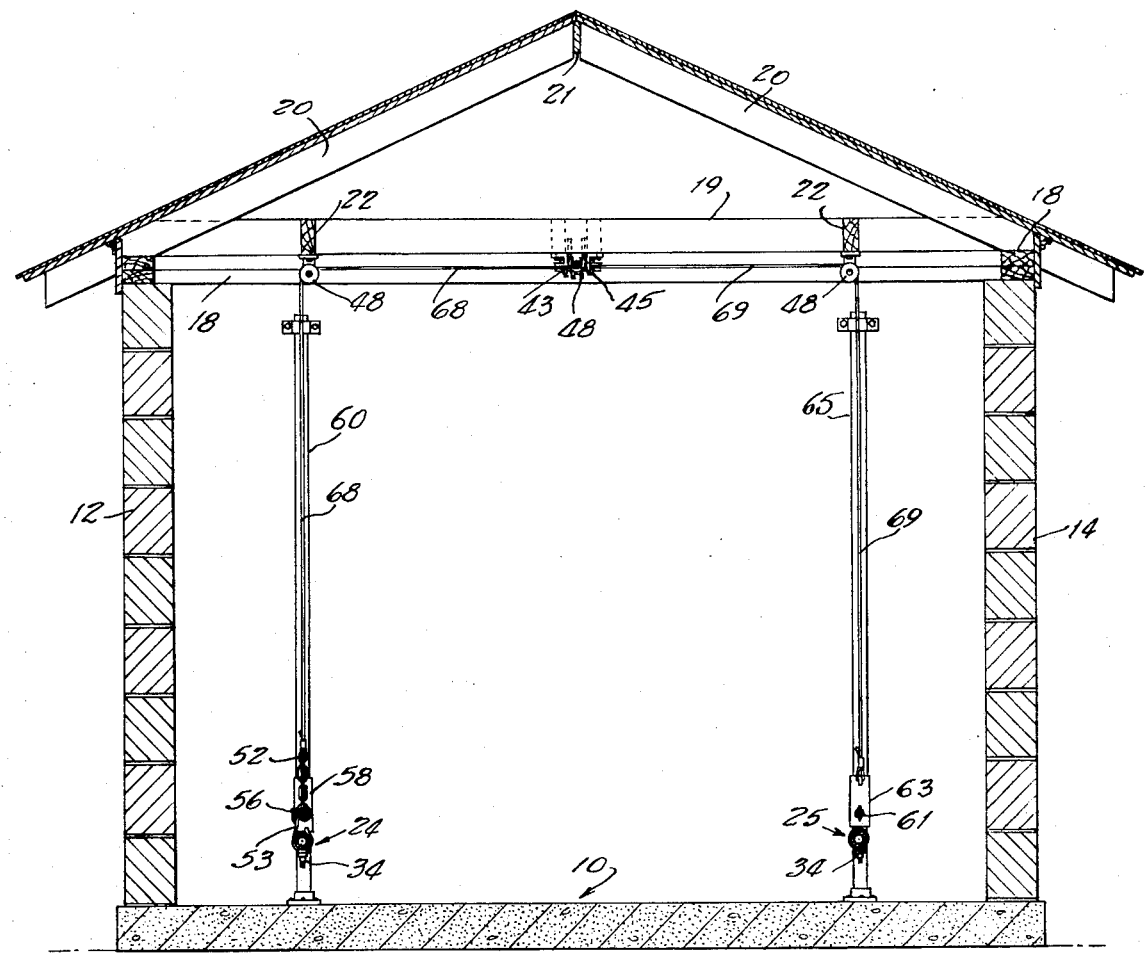
FIG. 3 is a transverse vertical sectional view of the enclosure as viewed along the line 3—3 of FIG. 2.

A water distribution system according to the invention is shown in FIGS. 1, 2 and 3 installed in an elongated rectangular building or enclosure, such as a poultry or brooder house, for example. As illustrated in the drawings, the floor 10 may be of concrete and the end walls 11 and 13, and the side walls 12 and 14 are fabricated of concrete blocks or similar masonry materials, an access door 15 being provided in the side wall 14. The roof structure includes wall plates 18, tie beams 19 (shown in phantom in FIG. 2), rafters 20 and ridgepiece 21. Joists 22 are connected between certain of the tie beams 19.

Figure 5:
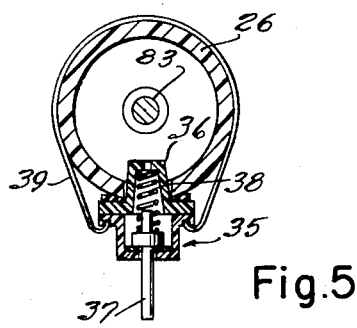
FIG. 5 is a transverse sectional view through the watering manifold, taken along the line 5—5 of FIG. 4, and showing one of the drinking valves provided thereon.

The illustrated system includes a plurality of watering manifolds 24 and 25 which extend along the length of the enclosure adjacent and parallel to the side walls 12 and 14, respectively. These manifolds are preferably of plastic pipe or conduit and have mounted thereon, at spaced intervals, suitable drinking valves as shown in FIG. 5 which will be subsequently described, the manifolds 24 and 25 being identical in structure and include several components. The manifold 24 includes sections 26 and 28 with an intervening pressure reducing device connected in the section 28 as will be described. Similarly, the manifold 25 includes sections 29 and 31 with an intervening pressure reducing device 30 connected therein.

A plurality of nibbler-type drinking valves 34 are mounted in spaced relation along the lengths of the sections, and these valves may be of the type shown in my U. S. Pat. No. 2,710,594 issued June 14, 1955, or in my copending patent application Ser. No. 820,237, filed Apr. 29, 1969, entitled Drinking Valve for Poultry and Livestock. Referring to FIG. 5, there is shown a suitable drinking valve 34 which includes a housing 35 defining a chamber having a generally cylindrical inlet boss 36 to be received in a suitable port provided in the wall of the manifold conduit. A valve closure member 37 includes a stem extending through an outlet opening in the housing biased by a spring 38 to close the outlet opening. The stem is engagable by a fowl or other animal to tilt or lift the closure member off its seat and permit the flow of water from the valve housing along the closure member stem. Each of the valves 34 is clamped to the manifold conduit by a suitable spring clip 39, and a suitable gasket is provided to maintain a seal between the valve housing 34 and the conduit wall, the valves 34 being desirably spaced along the lengths of the manifolds 24 and 25.

The manifolds are supported in adjustable parallel relation to the floor 10 by means of a cable system operated by a winch 42, including a reel, operated by a hand crank, and including a suitable locking device for locking the reel in adjusted positions. As best shown in FIGS. 1 and 2, a cable 43 is wound on the drum and extends upwardly therefrom over a pulley 44 secured to one of the joists 19 adjacent to the end wall 11, then along the center line of the enclosure through suitable eyelets or U-bolts 45 secured to the spaced joists 19, terminating adjacent to the end wall 13, as will be presently explained.

As shown in the drawings, support cables for the manifold 24 include the cables 46a, 46b, 46c and 46d and support cables for the manifold 25 include the cables 47a, 47b, 47c and 47d. Each of the cables passes over a pulley 48, secured to one of the joists 19 or braces 22, with a portion extending downwardly from each pulley 48 to be secured to the respective manifold and a portion extending transversely from the respective pulley toward the center of the enclosure and through an eyelet 45, the upper ends of the support cables being attached to the winch cable 43 by means of suitable clamps 49.

A length of chain 52 is attached to the lower end of each of the support cables having a hook 53 attached thereto, the latter having a spiral eyelet at one end for readily attaching and removing the hook to and from the chain 52, the hooks 53 supporting the manifold assembly. The chain and hook combination provide for the ready height adjustment of the hook relative to a support cable 56 to provide for leveling of the manifold relative to the floor and to compensate for any unequal stretch of the several support cables.

As best shown in FIG. 2, the support cables 46 and 47 are arranged to pass through the eyelets 45, and are clamped to the winch cable 43 at the winch side of these eyelets. In this manner, when the winch cable is reeled in, the support cables are caused to lift the respective manifolds, and conversely, when the winch is reversed to reel out the cable, the manifolds are lowered toward the floor.

As supported only the above-described cable system, the manifolds would swing free, and to obviate this a stabilizing system is provided. As best seen in FIG. 1, the stabilizing system for the manifold 24 includes a cable 56 extending the length of the enclosure parallel to the manifold 24, and anchored to sleeves 57 and 58 which are slidably mounted, respectively, on vertical standards 59 and 60 which are rigidly mounted adjacent to the end walls 11 and 13 respectively. A turn buckle is provided for controlling the slack in the stabilizing cable 56. A similar stabilizing system for the manifold 25 includes a cable 61 connected between sleeves 62 and 63 carried respectively on vertically supported standards 64 and 65.

The manifolds are maintained in the desired relation to the stabilizing cables 56 and 61 by means of the support hooks 53 which are first secured to the stabilizing cable in such manner that the cable passes through the eyelets whereupon the eyelets are secured to the desired link of the chain 52, the hook being positioned to support the manifold. In this manner, the stabilizing cable is confined by the hook eyelets so that the cable will move vertically with the support cables and with the manifold when vertical adjustments of the manifold relative to the floor is made with the winch 42. When this occurs, the supporting sleeves 57, 58, 62 and 63 will slide on their respective standards.

The sleeves 58 and 63 are supported on cables 68 and 69, respectively. The cable 68 is attached to and extends upwardly from the sleeve 58 and over suitable pulleys mounted on the braces 22 and attached to the winch cable 43 by a clamp 70. The cable 69 is similarly attached to the sleeve 63 and extends upwardly and over suitable pulleys and secured to the winch cable by means of a clamp 70. Through these cables the sleeves 58 and 63 are moved vertically with the respective manifolds.

A water supply control system is provided for each of the manifolds 24 and 25 and comprises an inlet pipe 71 passing through the end wall 11 and connected to a header 72 extending along the inner face of the end wall. At one end of the header 72, a flexible conduit 73 connects the header to a reservoir 74 which is shown as a closed rectangular tank supported on a bracket 75 secured to the sleeve 57. The reservoir 74 is adapted to be moved vertically along with the associated manifold 24 for any vertical adjustment of the latter so that the reservoir is generally maintained in the same vertically spaced relation to the manifold.

The reservoirs 74 function as pressure control devices and for this purpose the inlet conduits 73 are connected to inlet valves 76 controlled by floats 77. Outlet conduits 78 communicate with the bottoms of the reservoirs through suitable fittings to supply water from the reservoirs to the manifolds 24 and 25. The pressure of the water flowing to the drinking valves 34 is determined by the height of the reservoir 74 above the manifold.

In the illustrated system, the additional pressure breakdown devices 27 and 30, previously referred to, are provided. The device 27 for the manifold 24 comprises a reservoir in the form of a closed rectangular tank connected at opposite ends to the adjacent manifold portions 26 and 28. The manifold portion 26 defines the inlet for the reservoir 27, and the flow of water into the reservoir is controlled by a float controlled inlet valve 80. The water level is maintained by this valve just above the outlet openings to the manifold portion 28 so that a very low water pressure is available at the drinking valves for the manifold portion 28. With this arrangement water pressures between the manifold portions 26 and 28 are equalized.

To prevent the water in the manifolds and in the reservoirs from freezing, in the event the ambient temperature within the enclosure should drop to near or below freezing temperature, a heat cable 83 is arranged through the reservoirs and through the manifold and the connecting flexible conduits. The heat cables may be in the form of resistance conductors enclosed within a suitable sheath and connected to a suitable source of electrical energy through a temperature responsive control device 84. As shown in FIGS. 7 and 8, the control device 84 is mounted on the end wall 11, and connected to an electrical source through conductors 85.

With reference to the manifold 24, and having particular reference to FIGS. 7 and 10, the heat cables 83 pass from the control element 84 into the reservoir 74 through an opening in the cover thereof. The heat cable may be looped or coiled to provide sufficient heating within the reservoir, and then passes through the flexible outlet conduit 78 to the section 26 of the manifold 24. Adjacent to the reservoir 27, the manifold section 26 includes a T-fitting and a branch conduit 87 through which the heat cable 83 emerges and thence through the cover of the reservoir 27 and out through the section 28. A suitable sealing plug may be provided within the branch conduit 87 to prevent water loss from the manifold section 26, or alternatively, the branch conduit 87 may extend upwardly to a height above the water level in the reservoir 74 so that water will not flow from the conduit.

Figure 6:
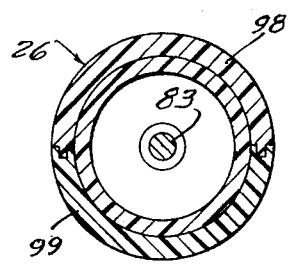
FIG. 6 is a transverse sectional view through a manifold coupling, as viewed along the line 6—6 of FIG. 4.
Figure 4:
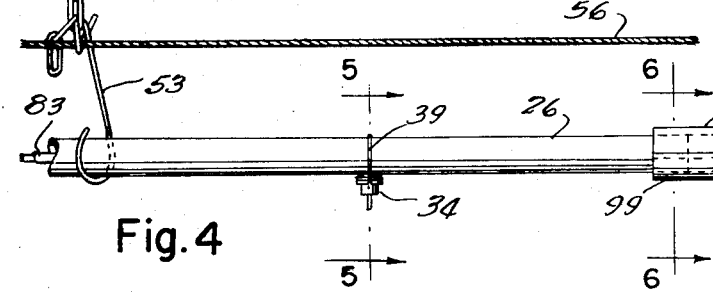
FIG. 4 is a fragmentary view of a watering manifold and supporting cable.

In assembling the manifolds having a heat cable therein, it may be desirable to use couplings made up of split halves 98 and 99, as illustrated particularly in FIG. 6, especially where it is desired to modify a system by shortening or lengthening the manifolds.

FIG. 9 of the drawing illustrates a modified manifold assembly which is particularly useful when it is desired to place growing cages 91 on the floor 10 and which may interfere with the desired positioning of the manifolds 24 and 25 relative to the floor. In the modified form, a manifold 92 is provided having depending nipples 93 of equal length and having drinking valves 94 secured to their lower ends enabling the drinking valves to be arranged at the desired heights from the floor with the horizontal header portion of the manifold lying above the upper extent of the cages 91.

The improved water distribution system described herein is particularly adapted for use in an enclosure such as a poultry house, or in a localized area of a poultry house or building, or multiple units may be employed to utilize the entire floor area of a relatively large building. The system is readily adjustable in height to accommodate animals and fowl of varying size and in various stages of growth. The system readily accommodates variations of pressure of water available at the drinking valves to accommodate different types of animals or fowl.

Although the invention has been described with reference to a particular preferred embodiment, certain changes and modifications will become apparent to those skilled in the art, in view of the foregoing description, which is intended to be illustrative and not limiting of the invention defined in the claims.

What is claimed is:

1. A water distribution system for an animal enclosure comprising a drinking assembly including an elongated manifold having longitudinally spaced drinking valves connected thereto;

a water supply reservoir, means supporting said reservoir in adjustable spaced relation above said assembly, and a flexible conduit connecting said manifold and said reservoir;

cable means suspending said assembly from the enclosure structure in spaced relationship to the floor thereof; said cable means including support cables suspended from the enclosure overhead structure and link chains at the lower extremities of the support cables, connected to said assembly at longitudinally spaced intervals therealong;

winch means operatively connected to said support cables for selectively raising and lowering said assembly relative to the enclosure floor;

stabilizer means for laterally positioning said assembly relative to said enclosure and accommodating the raising and lowering thereof; said stabilizer means comprising a cable extending substantially the length of said manifold, including vertical movable means anchoring the ends of said cable to said enclosure in a manner to permit upward and downward movement but limit lateral movement thereof;

hook means connected to said link chains and coupling said stabilizer cable and said manifold at longitudinally spaced points along the length thereof; each said hook means including a spiral eye at one end and a hook at the other end, said spiral eye adapted to be engaged with said stabilizing cable and with said link chains and said hook portion adapted to support the manifold, whereby said stabilizer cable and manifold are supported and maintained in selected vertically spaced relation, and whereby the position of said manifold may be adjusted relative to said suspending cable means.

2. A water distribution system as set forth in claim 1 wherein said vertical movable stabilizer means includes vertical guide members rigidly mounted in the enclosure in the plane of movement of said manifold adjacent to the opposite ends thereof;

and slide means mounted on said vertical guide means to which the ends of said stabilizer cable means are anchored.

* * * * *